Sept. 10, 1935.   D. J. CAMPBELL ET AL   2,014,225
CRANK SHAFT
Filed Dec. 26, 1933
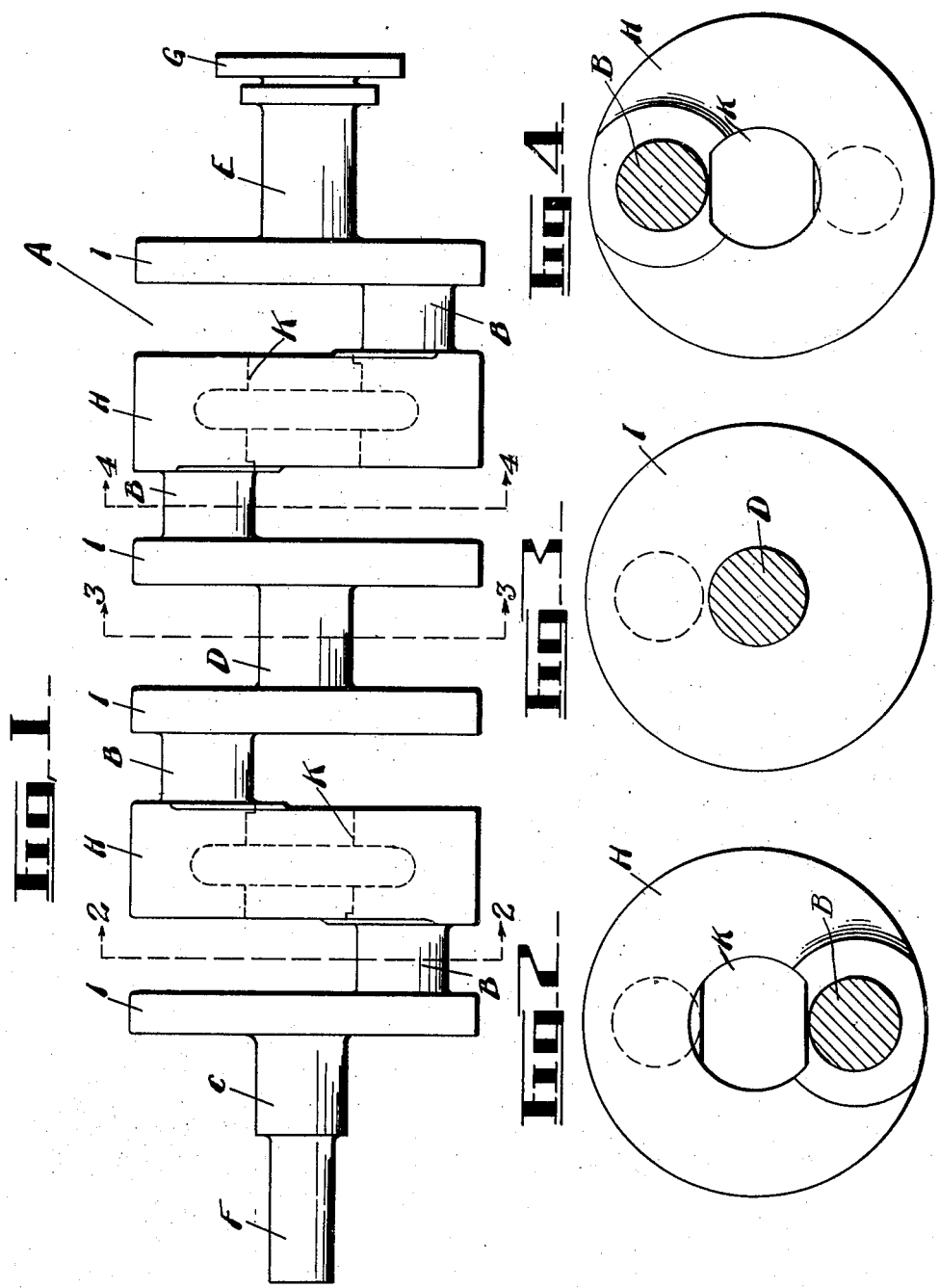
INVENTOR
Donald J. Campbell
Alfred R. Melcher
BY
Liverance & VanAntwerp
ATTORNEY Patented Sept. 10, 1935

2,014,225

UNITED STATES PATENT OFFICE 2,014,225

CRANK SHAFT

Donald J. Campbell, Spring Lake Township, Ottawa County, Mich., and Alfred A. Melcher, Los Angeles, Calif., assignors to Campbell, Wyant & Cannon Foundry Company, Muskegon Heights, Mich., a corporation of Michigan Application December 26, 1933, Serial No. 703,942

2 Claims. (Cl. 74—596)

This invention relates to crank shafts employed in engines and mechanical devices for converting reciprocating motion into rotary motion or rotary motion to reciprocating, but particularly to crankshafts for internal combustion engines.

Crank shafts in common include bearing portions at the ends and also intermedial the ends whereby the crank shaft is supported in bearings, and crank portions offset radially from the bearing portions which are in axial alinement and the crank portions eccentrically offset from the bearing portions are connected to the pistons of the engine or to a cross-head by connecting rods.

Crank shafts, and especially those employed in internal combustion engines, operate at extremely high rotative speeds and are subjected to severe vibrations and the objects of this invention are—the absorption and reduction to a minimum of vibrations to which the shaft is subjected; to eliminate twisting of the shaft and displacement of the ignition spark in relation to the pistons position and further eliminating the necessity of applying vibration dampeners for the absorption of vibrations.

An understanding of the invention may be had from the following description, taken in connection with the accompanying drawing, in which:

Fig. 1 is an elevation of a crank shaft made in accordance with our invention, and Figs. 2, 3 and 4 are, respectively, vertical sections on the lines 2—2, 3—3, and 4—4, looking in the directions indicated by the arrows.

Like reference characters refer to like parts in the figures of the drawing.

The crank shaft A includes bearing portions C, D and E in axial alinement. At the outer end of the part C is a reduced section F, while at the outer end of the bearing portion E is a flange collar G, well known in structures of this character. At the inner ends of each of the parts C and E and at each end of the intermediate bearing portion D are disks I circular in form. Between said disks I at the ends of the part D, and the other disks I at the inner ends of the parts C and E, are cranks, each consisting of a cylindrical member H from which crank bearing portions B extend to and connect with the adjacent disks I. All of the parts are formed as a single integral casting.

The members H are preferably the same diameter as the disks I. The crank bearings B are offset from the longitudinal axis of the members H, as shown, whereby the integral casting described forms an operative crank shaft having heavy flywheel effect sections H between adjacent crank bearings B to which the piston connecting rods are connected.

The members H, because of their mass and weight, tend, under the rapid rotation of the crank shaft about the longitudinal axis of the parts C, D, E and F, to absorb vibrations imparted to the shaft and to hold the crank true to such axis so as to rotate about it and counteract tendencies of the shaft to vibrate which disturb its rotative axis.

It is to be understood that the heavy flywheel members H preferably have their central portions cored out as indicated in dotted lines at K. Coring out the central portions decreases the weight without materially decreasing the stabilizing effect, inasmuch as the mass in the parts H, which has the effect of holding the crank shaft against vibration, has the greater effect the farther away it is from the axis of rotation. Also, the elimination of the central portions decreases the shrinkage of the flywheel members and consequently lessens the strains in the completed casting especially in and along its outer periphery.

The invention is defined in the appended claims and is to be considered comprehensive of all forms of structure coming within their scope.

We claim:

1. A crank shaft of cast metal comprising, a plurality of journal bearings, a plurality of cranks and flywheels between and connecting pairs of cranks to each other, said flywheels each having a cored axial recess of substantially cylindrical shape, the bearings, cranks and flywheels being integrally formed, certain portions of each of the cored recesses extending beyond the axial projection of the cranks.

2. A crank shaft of cast metal comprising, a plurality of journal bearings, a plurality of cranks, flywheels between and connecting pairs of cranks to each other, said flywheels each having a cored axial recess of substantially cylindrical shape, the bearings, cranks and flywheels being integrally formed, certain portions of each of the cored recesses extending beyond the axial projection of the cranks and integral means adjacent the ends of the cranks for reinforcing the same.

DONALD J. CAMPBELL.
ALFRED A. MELCHER.